(12) United States Patent
LaFlamme et al.

(10) Patent No.: US 8,167,510 B2
(45) Date of Patent: May 1, 2012

(54) SURFACE SCRUBBER WITH ROTATING PAD

(75) Inventors: Roger J. LaFlamme, Enfield, CT (US); Jim F. Warner, Westfield, NJ (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 1037 days.

(21) Appl. No.: 12/035,676

(22) Filed: Feb. 22, 2008

(65) Prior Publication Data
US 2008/0205965 A1 Aug. 28, 2008

Related U.S. Application Data

(60) Provisional application No. 60/891,338, filed on Feb. 23, 2007.

(51) Int. Cl.
*A46B 11/02* (2006.01)

(52) U.S. Cl. ............ 401/188 R; 401/205; 401/206

(58) Field of Classification Search .......... 401/188 R, 401/196, 205–207, 282; 222/206, 207, 213, 222/335, 632, 633
See application file for complete search history.

(56) References Cited

U.S. PATENT DOCUMENTS

| | | |
|---|---|---|
| 886,984 A | 5/1908 | Jopling |
| 1,217,054 A | 2/1917 | Pearman |
| 1,941,745 A | 1/1934 | Higley |
| 2,714,475 A | 8/1955 | Roehrich |
| 2,855,127 A | 10/1958 | Lerner et al. |
| 3,223,289 A | 12/1965 | Bouet |
| 3,396,419 A | 8/1968 | Richter et al. |
| 3,617,139 A | 11/1971 | Ross |
| 3,949,137 A | 4/1976 | Akrongold et al. |
| 3,981,106 A | 9/1976 | Gallo |
| 4,004,854 A | 1/1977 | Breer, II |
| 4,074,944 A | 2/1978 | Xavier |
| 4,098,434 A | 7/1978 | Uhlig |
| 4,124,316 A | 11/1978 | O'Rourke |
| 4,127,515 A | 11/1978 | MacRae et al. |
| 4,188,989 A | 2/1980 | Andersen |

(Continued)

FOREIGN PATENT DOCUMENTS

DE 4030851 4/1992

(Continued)

OTHER PUBLICATIONS

Stephen & Lawyer, Inc., Reticulated Foam, http://www.steplaw.com/reticulatedfoam.html, 2005.

(Continued)

*Primary Examiner* — David Walczak
(74) *Attorney, Agent, or Firm* — St. Onge Steward Johnston & Reens LLC

(57) ABSTRACT

A cleaning device includes an integral fluid dispenser therein that serves to dispense a fluid into the scrubbing pad of the device to improve the cleaning effectiveness of the device. The device includes a main body with a cleaning pad attached to one side thereof, an internal motorized assembly for rotating the cleaning pad upon depressing a button provided on a side of the main body and a fluid storage region that contains a cleaning fluid. A metered dosing pump is used to dispense a measured amount of fluid from the fluid storage region to cleaning pad upon actuation by the user. Further, the dispensing action and the rotation of the pad may be controlled by the same button or by separate buttons.

11 Claims, 4 Drawing Sheets

U.S. PATENT DOCUMENTS

| | | | |
|---|---|---|---|
| 4,702,397 | A | 10/1987 | Gortz |
| 4,753,006 | A | 6/1988 | Howe |
| 4,760,642 | A | 8/1988 | Kwak |
| 4,809,432 | A | 3/1989 | Schauble |
| 4,886,388 | A | 12/1989 | Gulker et al. |
| 4,888,868 | A | 12/1989 | Pritchard |
| 4,889,441 | A | 12/1989 | Tice |
| 4,890,744 | A | 1/1990 | Lane, Jr. et al. |
| 4,993,594 | A | 2/1991 | Becker et al. |
| 5,014,427 | A | 5/1991 | Byrne |
| 5,016,351 | A | 5/1991 | Drahus |
| 5,074,765 | A | 12/1991 | Pekar |
| 5,114,255 | A | 5/1992 | Villarreal |
| 5,168,628 | A | 12/1992 | Mock et al. |
| 5,176,510 | A | 1/1993 | Nilsson |
| 5,261,570 | A | 11/1993 | Hippely et al. |
| 5,265,772 | A | 11/1993 | Bartasevich et al. |
| 5,303,851 | A | 4/1994 | Libit et al. |
| 5,337,478 | A | 8/1994 | Cohen et al. |
| 5,353,961 | A | 10/1994 | Debush |
| 5,356,039 | A | 10/1994 | Christine et al. |
| 5,372,487 | A | 12/1994 | Pekar |
| 5,387,207 | A | 2/1995 | Dyer et al. |
| 5,441,345 | A | 8/1995 | Garvey et al. |
| 5,482,980 | A | 1/1996 | Pcolinsky |
| 5,505,341 | A | 4/1996 | Gueret |
| 5,555,673 | A | 9/1996 | Smith |
| 5,564,190 | A | 10/1996 | Fleetwood |
| 5,640,737 | A | 6/1997 | Boggs |
| 5,700,245 | A | 12/1997 | Sancoff et al. |
| 5,701,674 | A | 12/1997 | Mitchell |
| 5,704,723 | A | 1/1998 | Salisian |
| 5,761,813 | A | 6/1998 | Frick et al. |
| 5,836,482 | A | 11/1998 | Ophardt et al. |
| 5,842,607 | A | 12/1998 | Snider |
| 5,855,066 | A | 1/1999 | Manger |
| 5,865,554 | A | 2/1999 | Lin |
| 5,934,296 | A | 8/1999 | Clay |
| 5,944,032 | A | 8/1999 | Masterson |
| 5,950,928 | A | 9/1999 | Giang et al. |
| 5,983,500 | A | 11/1999 | da Silva |
| 6,170,108 | B1 * | 1/2001 | Knight ............... 15/29 |
| 6,183,154 | B1 | 2/2001 | Coe |
| 6,210,064 | B1 | 4/2001 | White et al. |
| 6,251,098 | B1 | 6/2001 | Rake et al. |
| 6,302,607 | B1 | 10/2001 | Burrowes et al. |
| 6,394,316 | B1 | 5/2002 | Daansen |
| 6,406,207 | B1 | 6/2002 | Wiegner et al. |
| 6,419,118 | B1 | 7/2002 | Rees et al. |
| 6,558,629 | B1 | 5/2003 | Davidson |
| 6,623,201 | B2 | 9/2003 | Brumlik |
| 6,629,799 | B2 | 10/2003 | Flores, Jr. |
| 6,641,307 | B2 | 11/2003 | Matsuda et al. |
| 6,715,952 | B1 | 4/2004 | Aiken et al. |
| 6,754,958 | B2 | 6/2004 | Haws et al. |
| 6,789,321 | B2 | 9/2004 | Simms |
| 6,789,706 | B2 | 9/2004 | Abergel et al. |
| 6,843,368 | B1 | 1/2005 | Frutin |
| 6,883,563 | B2 | 4/2005 | Smith |
| 6,886,254 | B1 | 5/2005 | Pennella |
| 6,910,274 | B1 | 6/2005 | Pennella et al. |
| 6,925,716 | B2 | 8/2005 | Bressler et al. |
| 6,929,155 | B1 | 8/2005 | Sayers |
| 6,964,097 | B2 | 11/2005 | Franzini et al. |
| 6,996,908 | B2 | 2/2006 | Orloff et al. |
| 7,043,841 | B2 | 5/2006 | Franzini et al. |
| 7,080,980 | B2 * | 7/2006 | Klupt ............... 433/80 |
| 7,121,754 | B2 | 10/2006 | Bressler et al. |
| 7,137,203 | B2 | 11/2006 | Bressler et al. |
| 7,137,531 | B2 | 11/2006 | Arghyris et al. |
| 7,156,132 | B2 | 1/2007 | O'Dougherty et al. |
| 7,159,742 | B2 | 1/2007 | Lee |
| 7,503,715 | B2 * | 3/2009 | Khubani ............... 401/6 |
| 7,789,583 | B2 * | 9/2010 | Kuo ............... 401/188 R |
| 2001/0025859 | A1 | 10/2001 | Dumont |
| 2001/0025860 | A1 | 10/2001 | Auer |
| 2002/0085873 | A1 | 7/2002 | Katsandres et al. |
| 2003/0077106 | A1 | 4/2003 | Weihrauch |
| 2003/0121936 | A1 | 7/2003 | De Laforcade |
| 2004/0092864 | A1 | 5/2004 | Boehm, Jr. et al. |
| 2004/0140326 | A1 | 7/2004 | Smart et al. |
| 2004/0177510 | A1 | 9/2004 | Pennella |
| 2004/0178284 | A1 | 9/2004 | Fahy et al. |
| 2005/0138814 | A1 | 6/2005 | Pennella et al. |
| 2005/0144785 | A1 | 7/2005 | Bressler et al. |
| 2005/0199651 | A1 | 9/2005 | Laflamme et al. |
| 2006/0072858 | A1 | 4/2006 | Kurosawa et al. |
| 2006/0150386 | A1 | 7/2006 | Wanli et al. |
| 2006/0254056 | A1 | 11/2006 | Coffin et al. |
| 2006/0255068 | A1 | 11/2006 | Genosar |
| 2006/0272154 | A1 | 12/2006 | Brevard |
| 2007/0017098 | A1 | 1/2007 | Bressler et al. |
| 2007/0084058 | A1 | 4/2007 | Szczepanowski et al. |
| 2007/0214646 | A1 | 9/2007 | Bezdek |

FOREIGN PATENT DOCUMENTS

| | | |
|---|---|---|
| DE | 29719331 | 12/1997 |
| DE | 29818058 | 1/1999 |
| FR | 2628394 A1 | 9/1989 |
| FR | 2683759 | 11/1991 |
| GB | 2083142 A | 3/1982 |
| JP | 6293348 | 10/1994 |
| JP | 10165668 | 6/1998 |
| JP | 2005199020 | 7/2005 |
| WO | 0176972 A1 | 10/2001 |
| WO | 0176974 A1 | 10/2001 |
| WO | 02071907 A1 | 9/2002 |
| WO | 2004096504 | 11/2004 |
| WO | 2005086852 A2 | 9/2005 |

OTHER PUBLICATIONS

3M Worldwide, Scotch-Brite Urethane Laminate 325HK 5 Pieces/Pack 72 Packs/Case, http://products3.3m.com/catalog/hk/en009/home_leisure/-/node_H16XQM6PDVgs/root_B . . . , 1995.

Plastic Bags for You, Pouch (zipper & non zipper), flat pouch, stand up pouch, with and without valve, with and without window, plain & preprinted, paper bag, etc., http://plasticbagsforyou.com/PRODUCTS/pouch-group.html, 2004.

* cited by examiner

SURFACE SCRUBBER WITH ROTATING PAD

CROSS-REFERENCE TO RELATED APPLICATIONS

This application is related to and claims priority from earlier filed U.S. Provisional Patent Application No. 60/891,338 filed Feb. 23, 2007.

BACKGROUND OF THE INVENTION

The present invention relates generally to product packaging and/or containers that include integrated dispensing devices. More specifically, the present invention relates to device that allows the user to introduce a metered dose of fluid in a controlled fashion into or onto the surface of a cleaning pad applicator prior to or during use.

Various types of fluid material and media are employed for different purposes throughout commerce and industry. For example, there are various products in the areas of personal care, home care, air care, transportation care and food industries that require a fluid material to be dispensed in some manner from a source of such material. Further, when this material is sold in commerce, it must be contained and stored in some type of container while awaiting use. Ultimately, when that product is used, it must be dispensed from its storage container to the desired location for use.

In the prior art, there are many different types of dispensers that are employed for the delivery of such a stored fluid material to its desired location for use. For example, a storage container having a flexible body with a nozzle tip extending therefrom is commonly provided for such a purpose. An example of such use can be seen in the context of a ketchup dispenser, where a user squeezes the container body to urge the fluid material (ketchup) out from container body and through the nozzle tip to accurately deposit the fluid material at the desired location. In such an application, the amount of fluid that is ultimately delivered is determined by the how much the user actually squeezes the container body. While this method has provided marginally acceptable results, this method also typically yields an erratic fluid volume since more or less fluid material may be delivered on each successive squeeze of the container body. Also, the container must be held upright to avoid leakage because no valves are employed in the fluid nozzle tip.

In another example of a prior art dispensing device, a flexible container is provided that holds a volume of fluid material to be delivered. In an attempt to overcome the leakage issue noted above, a single one-way check valve is provided at the exit port of the flexible container. When the flexible body is squeezed, the material is urged out under pressure through the valve. The difficulty here is that the valve, over time, becomes partially clogged thereby requiring that the user apply additional pressure to cause the valve to open. As a result, once the valve opens, the additional pressure causes more fluid material to be deposited than the user typically would have desired.

In addition to the controlled dispensing issue identified above, there is a desire in the art not only to simply dispense the fluid material but also to help apply them, such as to a surface. In the prior art, the solution to such an application was the provision of squeezable container bodies that are equipped with some type of applicator head for this purpose. For example, in the home care cleaning industry, there are many types of surface cleaners that include an integrated cleaning pad that is employed for contact with the surface to be cleaned. It is also common for the surface cleaning device to include an auxiliary supply of liquid cleaner therein for delivery directly to the surface to be cleaned. For home cleaning, such as for cleaning dishes and pots, a supply of liquid dish soap is commonly stored within a hollow handle of the scrubbing device so that when it is held upright during use, the fluid gradually exits from the exit port and into the cleaning pad to facilitate cleaning of the dishes. To provide some control over the flow of the dish soap, some of these prior art devices have included a simple one-way check valve on the bottom of the pad that can be depressed to release cleaning fluid therethrough.

However, rather than relying simply on gravity or capillary flow and the use of a single check valve to control the dispensing of the cleaning fluid, it is desirable to have the liquid cleaner be injected into the pad, onto the pad or be directed immediately under the porous surface of the pad in a metered dosed fashion. It is also desirable that the pad rotates during use to facilitate the cleaning effort.

Accordingly, there is a need for a fluid container that provides a selective dosing mechanism that is easy to operate. There is a further need for a device that can dispense fluid materials in a metered fashion where the dispersion of the fluid can be controlled. There is still a further need of a device that includes an internal reservoir for storing fluid therein while also including a means for dispensing the fluid into an applicator pad in a controlled and metered fashion in order to produce predictable flow and a better control of the fluid material application. Many of these needs are met by commonly owned, co-pending U.S. patent application Ser. No. 11/074,817, filed on Mar. 8, 2005 and U.S. patent application Ser. No. 11/951,351, filed on Dec. 6, 2007, which are incorporated herein by reference. There is still a further need that such a device includes a pad that rotates and an integrated means for delivering fluid to the pad in a metered fashion. In response to this need, this application sets forth a device for dispensing a fluid material from a reservoir in a metered fashion into an applicator that is attached to or surrounds the outer surface of the reservoir.

BRIEF SUMMARY OF THE INVENTION

In this regard, the present invention preserves the advantages of prior art cleaning devices that include liquid dispensers for the dispensing cleaning fluids and the like. In addition, the present invention provides new advantages not found in currently available devices while overcoming many of the disadvantages identified above that are inherent in the currently available devices.

The present invention is generally directed to a novel and unique surface scrubber device that also includes an integrated fluid dispenser. The fluid dispenser serves to dispense a fluid into the scrubbing pad of the device to improve the cleaning effectiveness of the device. It should be appreciated that many different types of fluids may be dispensed using the present invention and cleaning fluid is one example that will be discussed in detail herein. However, the example provided is intended to be illustrative and this invention shall not be considered to be limited to the dispensing of cleaning fluid in a cleaning device environment. In other words, it is envisioned that while the present invention has particular use for cleaning dishes and pots, it also has other applications, such as for cleaning cars, cleaning people's skin and other uses. All of these uses are within the scope of the present invention.

Generally, the surface cleaning device of the present invention includes a main body that is preferably made of a rigid, semi-rigid or soft base material and is configured to be suitable for grasping by a user's hand. A cleaning pad is attached to one side of the main body and an internal motorized assembly rotates the cleaning pad upon depressing a button provided on a side of the main body. It is possible that the motor can be battery driven or driven by a wind-up mechanism. Within the main body of the cleaning device structure is also a fluid storage region that contains a cleaning fluid. An important feature of the present invention is the use of a metered dosing pump that serves to deliver, upon actuation by the user, a measured amount of the cleaning fluid contained therein. The metered dosing pump mechanism employed within the present invention is substantially similar to that found in the above noted U.S. patent application Ser. Nos. 11/074,817 and 11/951,351. A metering housing, having a preferably flexible construction, is disposed in fluid communication with the fluid storage region and a first one-way valve is disposed between the fluid storage region and the flexible metering housing. When the flexible metering housing is depressed and released a vacuum action generates a one-way flow from the interior fluid storage region of the device that serves to fill the predetermined volume of the chamber within the metering housing. A second valve, in fluid communication with the metering housing output port, permits one-way fluid flow from the metering chamber to the cleaning pad when the metering housing is depressed again. Each time the metering housing is depressed a substantially equal volume of fluid is dispensed into the cleaning pad, while upon release, the metering housing is refilled by drawing fluid from the fluid storage region.

Actuation of the metered dosing pump may be accomplished by pressing the same button as above for actuation of the rotation of the pad or by a second button. In turn, a predetermined amount of cleaning fluid exits from an exit port or exit ports on the bottom of the main body into the pad to permit it to propagate throughout the cleaning pad. The user then grasps the main body of the device and moves it accordingly for the desired cleaning. When more cleaning fluid is needed for delivery to the surface to be cleaned, the user simply presses the button or the second button to deliver the cleaning fluid, as described above. Thus, rotation of the pad and cleaning fluid may be linked together to operate at the same time or they may be independently controlled.

Preferably, a single exit port is employed on the bottom of the main body for simplicity of construction, although multiple ports may be provided as well. If a single exit port is used, rotation of the rotating pad will assist in evenly distributing the cleaning fluid throughout the pad.

It is therefore an object of the present invention to provide a fluid dispensing device that can transfer a substantially equal volume of fluid additive from a fluid storage region to a cleaning pad with each dispensing operation. It is a further object of the present invention to provide a device that can dispense fluid materials in a metered fashion where the dispersion of the fluid can be controlled. It is still a further object of the present invention to provide a device that includes an internal reservoir for storing fluid therein while also including a means for dispensing the fluid into an applicator pad in a controlled and metered fashion and an actuator that induces movement in the applicator pad to enhance the cleaning action.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
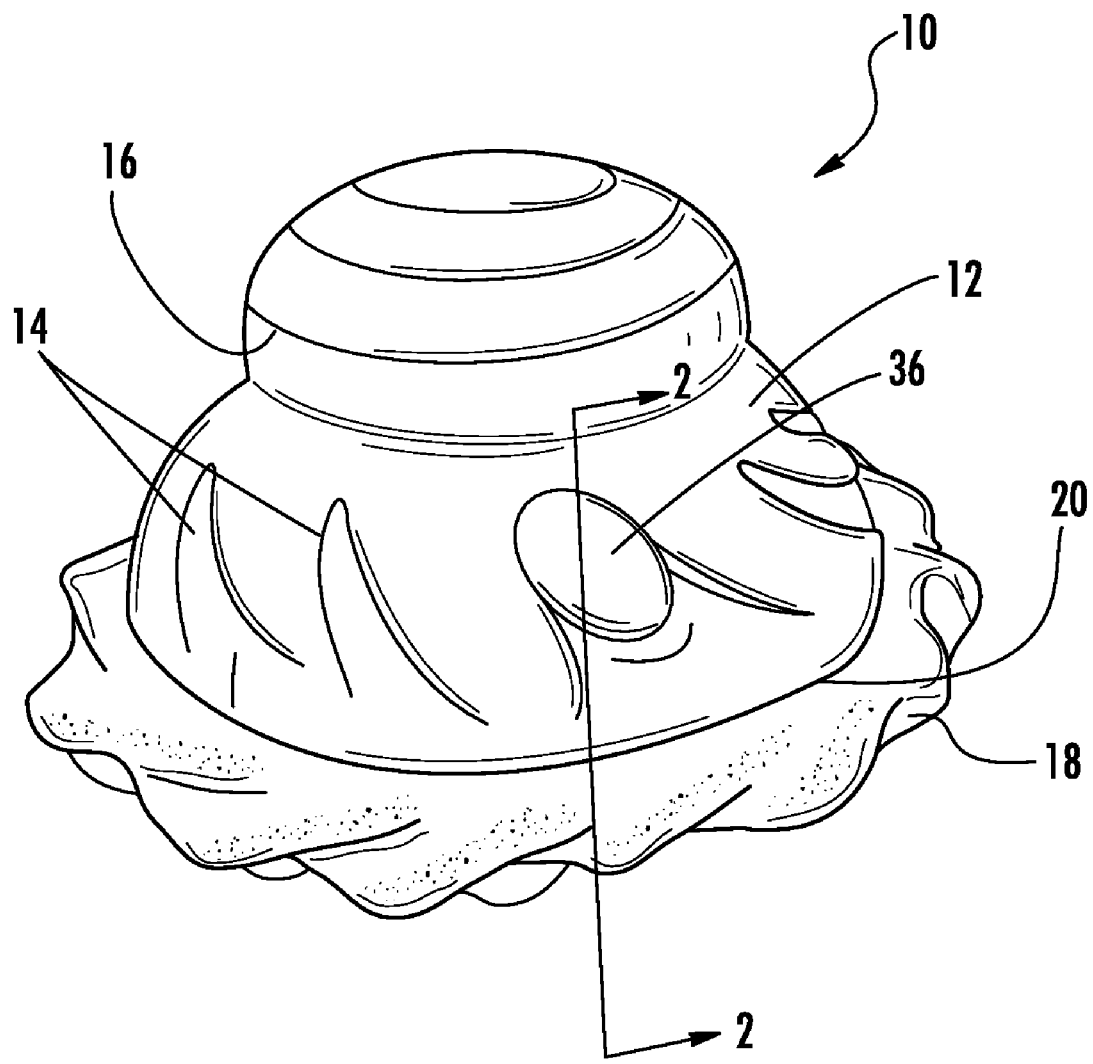
FIG. 1 is a perspective view of the dispensing device of the present invention.

Now referring to the drawings, the dispensing device of the present invention is shown and generally illustrated at 10 in FIG. 1. As was stated above, the present invention is generally directed to a novel and unique surface scrubber device that includes an integrated fluid dispenser positioned therein. In this regard, fluid dispenser serves to dispense a fluid into the scrubbing pad of the device to improve the cleaning effectiveness of the device.

Generally, the dispensing device 10 of the present invention includes a main body 12 that is preferably made of a rigid, semi-rigid or soft base material and is configured to be suitable for grasping by a user's hand. In this manner, surface enhancements 14 or gripping contours 16 may be provided to enhance the user's ability to grasp and retain the device 10. A pad member 18 can be seen attached to an engagement surface 20 positioned on one side of the main body 12. Further, as will be described below in connection with FIG. 2, an internal motorized assembly is provided to introduce movement of the pad member 18 relative to the main body 12 of the device 10.

It should be appreciated in the context of the present invention that many different types of fluids may be dispensed using the present invention and cleaning fluid is one example that will be discussed in detail herein. However, the example provided is intended to be illustrative and this invention shall not be considered to be limited to the dispensing of cleaning fluid in a cleaning device environment. In other words, it is envisioned that while the present invention has particular use for cleaning dishes and pots, it also has other applications, such as for cleaning cars, cleaning people's skin and other uses. Further, any number of different materials may be used for the construction of the pad member 18. The selection of such material will be wholly dependent on the end use for the device and is not set forth herein as such materials are all well known in the art. All of these uses are within the scope of the present invention.

Figure 2:
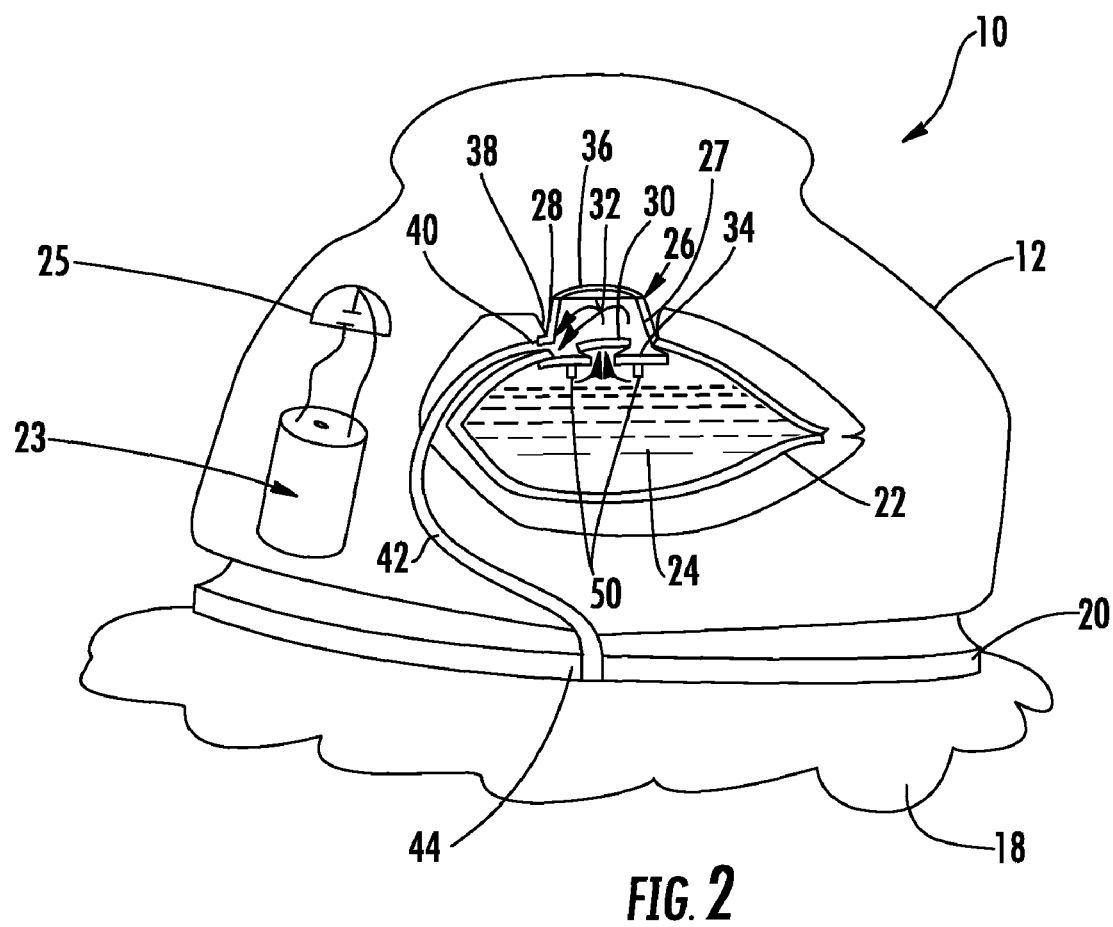
FIG. 2 is a cross sectional view of the dispensing device of the present invention taken along line 2-2 of FIG. 1.

Turning now to FIG. 2, a cross section of the fluid dispensing device 10 of the present invention is shown. In this view it can be seen that the fluid dispensing device 10 includes a fluid storage region 22 that is positioned within the main body 12 and a motorized means 23 for introducing motion of the pad member 18 relative to the main body 12. The present application utilizes the term introducing motion for the movement of the pad member 18 as a general term to describe any mechanically induced movement of the pad member 18 relative to the main body 12. Such a mechanically induced motion may include, but is not limited to, vibration, single directional rotation, alternating rotation, random orbital rotation and linear movement.

As can be seen in this embodiment, a button 25 provided on a side of the main body 12 that when depressed engages the motor 23 to induce movement of the pad member 18. The present invention further includes the possibility that that the motor 23 can be battery driven or driven by a wind-up mechanism using any known device in the art. It can also be seen that the engagement surface 20 may be a separate component that itself is movable relative to the main body 12 of the dispenser 10 with the pad member 18 being affixed thereto. In this arrangement, the motor 23 serves to induce movement of the engagement surface 20 relative to the main body 12 where the movement of the engagement surface 20 in turn causes movement of the pad member 18 affixed thereto.

It can also be seen that a fluid storage region 22 is provided within the main body. The fluid storage region 22 is configured as a reservoir for containing a cleaning fluid 24. Further, a metered dosing pump 26 is provided in fluid communication with the fluid storage region 22. The metered dosing pump 26 is selectively operable to deliver, upon actuation by the user, a measured amount of the cleaning fluid 24 contained therein. Still referring to FIG. 2, the internal construction of the metering pump 26 in relation to the fluid storage region 22 of the dispenser 10 of the present invention is shown. The fluid storage region 22 contains a volume of fluid material 24 therein. The outer wall of the fluid storage region 22 is preferably made of a flexible material, such as plastic or nylon. Thus, as fluid material 24 is evacuated from within the fluid storage region 22, it will collapse gradually for a compact structure.

The metering pump 26 is in fluid communication with the fluid storage region 22. The metering pump 26 includes a metering housing 27 provided at a first opening 28 in the fluid storage region 22. The metering housing 27 includes an intake one-way valve 30, such as a check valve, to pull fluid 24 from the fluid storage region 22 into the metering chamber 32 of a predetermined size. Any type of valve can be used to suit the given application. The intake valve 30 is positioned in a base plate 34 of the metering housing 27. Thus, fluid 24 can only flow in one way from the fluid storage region 22 into the metering chamber 32. The metering chamber 32 is defined by a flexible membrane 36 in the form of a button or bulb that is accessible and manipulatable on the exterior surface of the main body 12 of the device 10. The button 36 is preferably clear to provide an indicator to the consumer when the metered dosage of fluid material 24 is ready for delivery. An output valve 40 is provided in fluid communication with the metering chamber 32 of the metering housing 27. Thus, the fluid residing in the metering chamber 32 can only exit through the output valve 40. Also, a fluid conduit 42 is provided to direct the exit of the fluid 24. In this particular case to an opening 44 in the engagement surface 20 adjacent the pad member 18. In accordance with the present invention, each press of the flexible membrane 36 causes a metered amount of fluid 24 to be forced through the opening 44 to provide the desired measured dosing application. This button/membrane 36 can be placed anywhere on the device, as needed.

Still referring to FIG. 2, the operation of the metered dosing pump 26 is further explained. The button 36 of the metering housing 27 is depressed to initiate a vacuum operation. More specifically, when the button 36 is further released, fluid 24 is pulled from the fluid storage region 22 into the metering chamber 32 which is configured to be of a certain known volume. The act of releasing the button 36 fills the metering chamber 32 to substantial capacity. Thus, a metered amount of fluid material 24 is contained within the metering chamber 32 in preparation for delivery. The size of the metering chamber 32 can be selected according to the type of fluid material 24 to be dispensed, the application therefor and the desired dosage volume. A further depression of the button 36 urges the measured volume of fluid 24 within the metering chamber 32 to exit out through the output valve 40 of the metering housing 27. This known amount of fluid material 24 is then routed into through the fluid conduit 42 and out through the opening 44 engagement member 20.

In most cases, the fluid 24 is then deposited onto the rear surface of the pad member 18 although it is also within the scope of the present invention to route the fluid conduit 42 so that the fluid 24 is deposited into the pad member 18 or onto the front surface of the pad member 18.

It can also be seen in FIG. 2 that a number of standoff legs 50 emanate downwardly from the base plate 34 of the metering housing 27. These legs 50 prevent the base plate 34 from completely bottoming out against the walls of the fluid storage region 22 thereby blocking flow of fluid material 24 into the intake valve 30. The standoff legs 50 are particularly useful when the volume of fluid material 24 left in the fluid storage region 22 is running low and the fluid storage region 22 is becoming relative flat in configuration. In this situation, there is a possibility that the aforesaid bottoming out may occur. However, the use of the standoff legs 50 prevents this from occurring. It should also be appreciated that while standoff legs 50 are shown, other spring biased or spring like structures may be used to accomplish the same function and should be considered interchangeable with the standoff legs 50.

Figure 3:
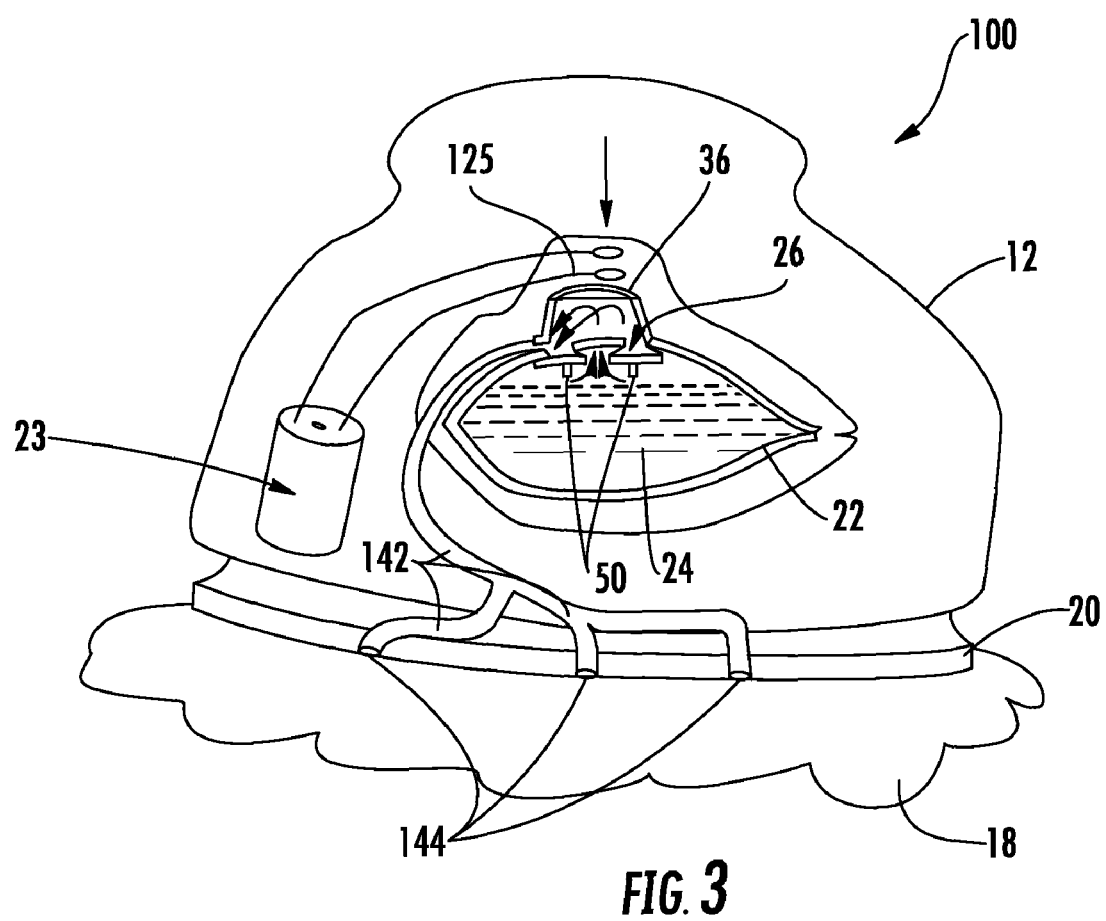
FIG. 3 is a cross sectional view of an alternate embodiment of the dispensing device of the present invention.

Turning now to FIG. 3, an alternate embodiment of the device 100 of the present invention is shown. This embodiment is the same in all respects as that described above except that the button 125 for actuating the motor 23 and inducing movement of the pad member 18 is positioned adjacent the dome 36 of the metered dosing pump 26. In this regard, actuation of motor 23 is accomplished simultaneously with actuation of the metered dosing pump 26 by pressing in the direction of the arrow depicted. Further, a plurality of fluid conduits 142 are provided to deliver fluid to multiple outlet 144 locations within the pad member 18.

In operation using either of the two embodiments described above, a predetermined amount of cleaning fluid 24 exits from an exit port 44 or exit ports 144 on the bottom of the main body 12 into the pad member 18 to permit it to propagate throughout the pad member 18 and the motor 23 is actuated to induce movement of the pad member 18. The user then grasps the main body 12 of the device and moves it accordingly for the desired cleaning. When more cleaning fluid 24 is needed for delivery to the surface to be cleaned, the user simply presses the dome 36 of the metering pump 26 to deliver the cleaning fluid 24, as described above. Thus, rotation of the pad 18 and cleaning fluid 24 may be linked together to operate at the same time or they may be independently controlled.

Figure 4:
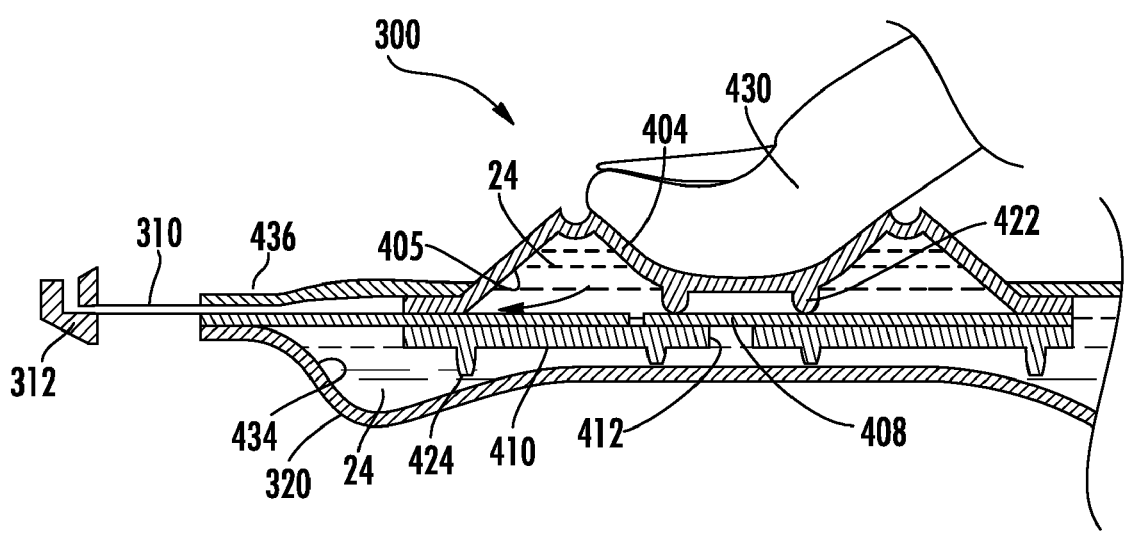
FIG. 4 is a cross sectional view of an alternate embodiment dispensing pump of the invention.

Turning now to FIG. 4, details are shown of an alternate metering pump 300 that includes the improved valving of the present invention that prevents inadvertent or accidental dispensing of fluid 24 even when pressure is placed on the pump 300 or the fluid storage region 320. In this embodiment of the pump 300 of the present invention, the base plate 410, through which the flow through aperture 412 passes, is preferably slightly convex, although it may be flat, if desired. Resting above the aperture 412 and within the cavity 405 of the dome is a flapper valve 408 of preferably thin film construction. It is possible that this flapper valve 408 be configured of a normally open condition but also may be configured to lie flat when at rest. As long as the plate 410 with the aperture remains convex, the flapper valve 408 does not seal against the aperture 412 such that any inadvertent contact with the flexible dome pump housing 404 does not result in the dispensing of the product. Instead, since the flapper valve 408 is open, liquid product residing inside the cavity 405 of the flexible pump housing 404 will tend to simply flow back through the inlet aperture 412 to the reservoir within the storage container itself, as indicated by the arrow, rather than flow undesirably out through the exit valve to outside of the pump 300. In use, if a person has the fluid dispenser in their pocket or purse and pressure is accidentally or unintentionally placed on the flexible housing 404 of the pump 300, liquid will not flow outside the dispenser thereby preventing a mess from being made due to unintentionally dispensed product.

FIG. 4 illustrates intentional dispensing of fluid 24. When it is desired to actually dispense the liquid product 24, the user's thumb 430 can depress the flexible dome 404. By application of force against the stand-off legs 424, such that flexible dome 404, with the assistance of the stand-off legs 422 under the flexible dome, securely seals and provides a positive lock of the flapper valve 408 over and about the aperture 412 thereby closing the liquid flow passage back into the reservoir 434 of the second fluid reservoir 320. It is also possible that the base plate 410 is concave and then is inverted to a convex configuration. Other fingers of the user may be used to carry out this operation. Thus, the only path for the liquid 302 contained within the cavity 405 of dome 404 is to exit through the one-way outlet valve 436 for intended dispensing of the product, as indicated by the arrows.

It should be understood that the stand-off legs 422 on the bottom of the flexible dome housing 404 and the stand-off legs 424 on the bottom of the base plate 410 can be modified in size, length and configuration to adjust the amount of squeezing necessary by the user's fingers 430 to effectuate sealing of the flapper valve 408. For example, preferably four standoff legs 422 are provided on the bottom of the flexible dome housing 404 in a 2 times 2 array and can be ⁄1;32 of an inch in length. It is also possible that these standoff legs 422 can be a single downwardly depending wall, such as in the shape of a circle or square. Such an array is configured to downwardly press against the one-way flapper valve 408 outside of the diameter of the aperture 412 through the base plate 410 to provide a good seal of the flapper valve 408 to the base plate 410.

It can therefore be seen that the present invention to provides a fluid dispensing device that can transfer a substantially equal volume of fluid from a fluid storage region to a cleaning pad with each dispensing operation. Further, the present invention provides a device that includes an internal reservoir for storing fluid therein while also including a means for dispensing the fluid into an applicator pad in a controlled and metered fashion and an actuator that induces movement in the applicator pad to enhance the cleaning action.

It would be appreciated by those skilled in the art that various changes and modifications can be made to the illustrated embodiments without departing from the spirit of the present invention. All such modifications and changes are intended to be covered by the appended claims.

What is claimed:

1. A fluid dispensing device, comprising:
a main body containing a flexible fluid storage region therein and an engaging surface;
a pad member affixed to the engaging surface of the main body;
an actuator operably connected between the pad member and the main body for providing a movement to the pad member relative to the main body; and
a metered pump in fluid communication with the flexible fluid storage region, and metered pump comprising a flexible metering housing that is located and manipulatable on an exterior of the main body, having a metering chamber therein with a predetermined volume and a metering housing output port, the metering housing in fluid communication with the flexible fluid storage region, the metered pump also comprising at least one exit port adjacent the engaging surface, wherein depression of the metering housing urges fluid from the flexible fluid storage region through the at least one exit port and into the pad member.

2. The dispenser of claim 1, wherein the actuator is an electrical motor assembly.

3. The dispenser of claim 1, wherein the actuator is a wind-up motor assembly.

4. The dispenser of claim 1, wherein the movement is selected from the group consisting of: vibration, single directional rotation, alternating rotation, random orbital rotation and linear movement.

5. The dispenser of claim 1, further comprising a user manipulatable button for selectively operating the actuator.

6. The dispenser of claim 5 wherein the metered pump and user manipulatable button are arranged such that user actuation results in both dispensing of fluid and operation of the actuator.

7. The dispenser of claim 1, the metered pump further comprising:
a first valve disposed between the fluid storage region and the flexible metering housing to permit unidirectional fluid flow from the fluid storage region into the metering chamber thereby filling the predetermined volume of the metering chamber; and
a second valve, having a second valve output port, in fluid communication with the metering housing output port and permitting unidirectional fluid flow of a volume of fluid substantially equal to the predetermined volume of the metering chamber from the metering chamber via the second valve output port.

8. The dispenser of claim 1, wherein the at least one exit port directs the fluid onto a front surface of the pad member.

9. The dispenser of claim 1, wherein the at least one exit port directs the fluid onto a rear surface of the pad member.

10. The dispenser of claim 1, wherein the at least one exit port is a plurality of exit ports formed in the engaging surface.

11. The dispenser of claim 1, wherein the pad member is replaceable.

* * * * *